United States Patent [19]

Bodewes

[11] 4,074,805
[45] Feb. 21, 1978

[54] INSTALLATION EQUIPMENT WITH A DRIVING MECHANISM

[75] Inventor: Hermanus J. A. Bodewes, Uden, Netherlands

[73] Assignee: Rapistan Incorporated, Grand Rapids, Mich.

[21] Appl. No.: 731,824

[22] Filed: Oct. 12, 1976

[30] Foreign Application Priority Data

Dec. 8, 1975 Netherlands .......................... 7514253

[51] Int. Cl.$^2$ ............................................. B65G 13/02
[52] U.S. Cl. .................................... 198/790; 198/783
[58] Field of Search .............. 198/783, 789, 790, 793, 198/731, 733, 802, 832, 833; 74/229, 247, 245 R, 245 C, 245 LP, 245 P, 250 R; 250 C

[56] References Cited

U.S. PATENT DOCUMENTS

| | | |
|---|---|---|
| 3,040,872 | 6/1962 | Hohl ..................................... 198/790 |
| 3,158,252 | 11/1964 | Vogt ..................................... 198/783 |
| 3,176,828 | 4/1965 | Sullivan ............................... 198/783 |
| 3,306,430 | 2/1967 | Fogg ..................................... 198/790 |

Primary Examiner—Johnny D. Cherry
Assistant Examiner—Joseph E. Valenza
Attorney, Agent, or Firm—Price, Heneveld, Huizenga & Cooper

[57] ABSTRACT

A conveyor propelling member is disclosed. The propelling member consists of a chain to provide a primary tension load member and a plurality of strips of a flexible material, such as plastic, having a relatively high coefficient of friction. The strips are of a length equal to a number of chain links and, at spacings equal to two chain links, have lugs which seat through openings in the chain leaving the remaining chain link openings free for engagement by a sprocket. These strips are arranged in tandem along the entire length of the chain. The lugs at the ends of each strip are stiffened by rivets.

9 Claims, 6 Drawing Figures

INSTALLATION EQUIPMENT WITH A DRIVING MECHANISM

BACKGROUND OF THE INVENTION

The invention concerns an installation with a driving mechanism for the movement of objects which come into contact with the driving mechanism.

With conveyor belts and similar installations for the movement of objects, the objects are most frequently driven either directly or through the use of intermediate rollers by means of a single driving mechanism in the form of a broad belt with one or more strings or narrow belts. For the manufacturing of the broad belt a large amount of material is needed and at the same time the parts of the installation for the conducting or support of the belt occupy a proportionally large amount of space.

When strings or narrow belts are used which occupy less space than the broad belt, often the problem is created that the force that needs to be transmitted by the strings for the movement of the object is such that the strings are not sufficient in a number of cases.

The purpose of the invention is to obtain an installation of the type mentioned above but which avoids the defects of the present state of the art.

According to this invention this purpose is obtained by a driving mechanism consisting of a chain which on the side which comes in contact with the objects that need to be moved is equipped with a spring or resilient layer.

With the chain a large force can be transmitted while between the chain and the objects that have to be moved a good or effective contact is obtained through the application of the spring layer, without, in so doing, damaging the object that have to be moved. Below the invention will be detailed on the basis of the drawings of a sample execution of the construction of the invention.

DESCRIPTION OF THE PREFERRED EMBODIMENT

Figure 1:
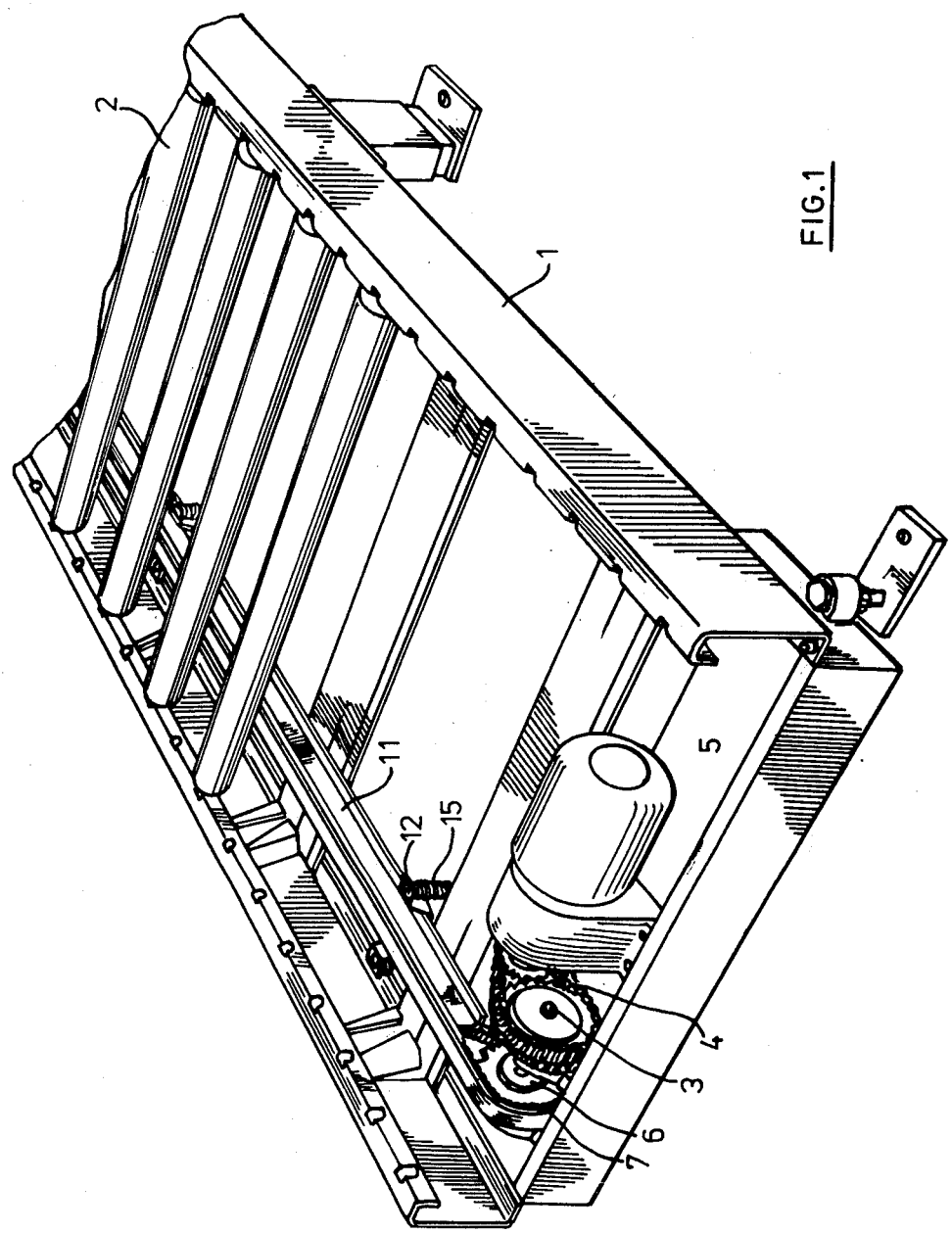
FIG. 1 shows a schematic perspective of a part of an installation of a conveyor belt according to this invention.

The conveyor belt shown in FIG. 1 contains a support 1 in which a number of free moving rollers 2 are located parallel to each other. Near the far end of the support an extended axle 3 is installed in the support 1 parallel to the rollers 2 which is connected to a driving motor 5 by means of a chain and a chain wheel 4.

Figure 2:
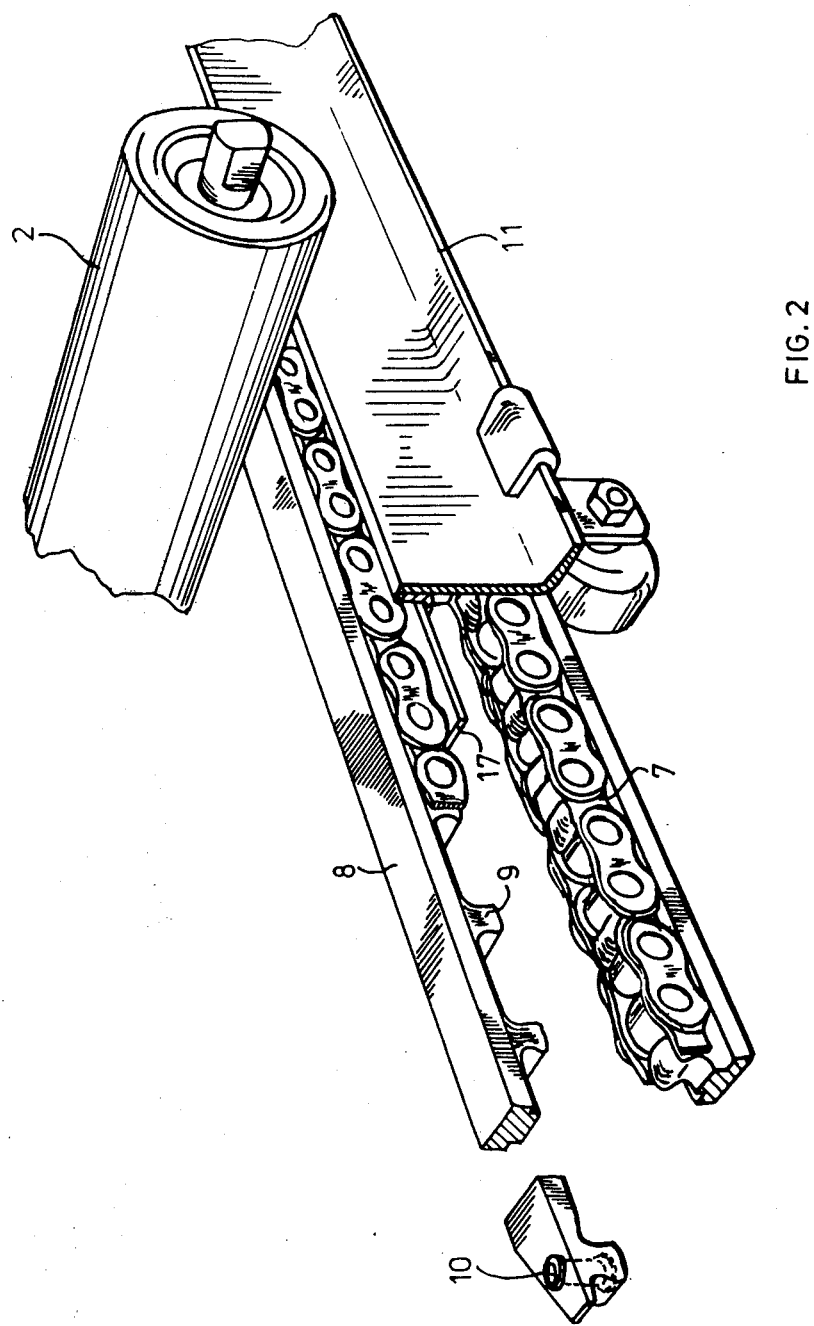
FIG. 2 shows, on a larger scale and in perspective, a part of the chain equipped with a spring layer and an object formed by a roller to be put in motion by means of the chain.
Figure 4:
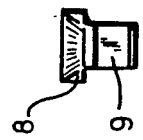
FIG. 4 shows a side view of FIG. 3.
Figure 5:
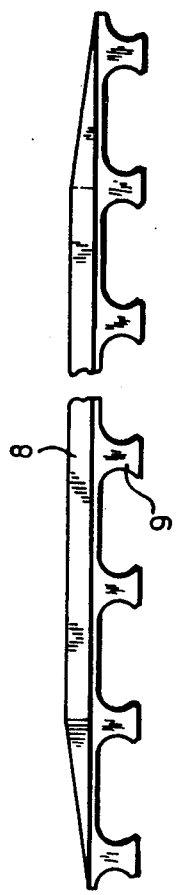
FIG. 5 shows a top view of FIG. 3.

As is further evidenced by FIG. 2, the chain is equipped with a spring layer which, preferably, is made from an elastic synthetic material strip 8, with a T-shaped cut or cross section, and to which are added teeth 9 which form an integral part of the strip. The smaller part of the T-shaped profile 8 is such that it fits in the openings, that is, between the sides of the chain 7.

Figure 3:
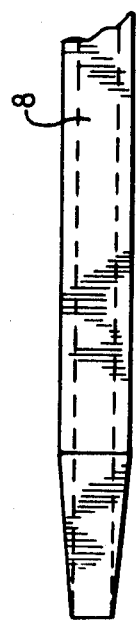
FIG. 3 shows a spring layer to be installed on the chain.
Figure 6:
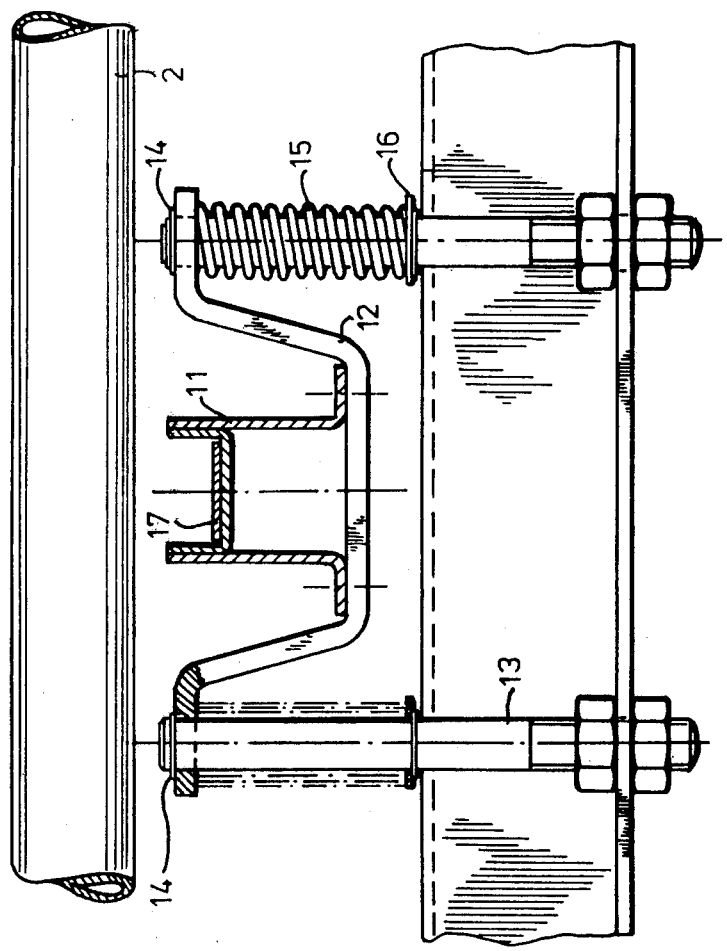
FIG. 6 shows the support construction for the top part of the chain.

The ends of the projections 9 are enlarged lengthwise of the strips to form a head as illustrated in FIG. 3 and these enlarged ends or heads extend substantially through the chain as shown in FIG. 2.

The distance between each tooth or projection 9 is twice the length of the chain links. For attaching the spring strip 8 to the chain, the projections are placed between the pintles of the chain. It will become clear from this that, on account of the selected distance between the projections 9 filling spaces between the pintles of the chain, between two projections there will still be an opening. The cog wheels which work in conjunction with the chain are constructed in such a manner that each tooth of the cog engages in one of these free spaces between the pintles of the chain 7.

As is further evidenced by FIG. 3, the ends of the strip 8 are tapered. As is indicated in FIG. 2, rivets 10 are installed only in the projections 9 located at the ends of the elastic strip in order to counteract an easy deformation of these projections and the subsequent loosening of the elastic strip.

The upper part of this endless chain 7 is supported by a guide 11 to which are attached stirrups 12. In the ends of these stirrups are holes through which the upwardly elongated, vertical supports 13 project, supported from the support 1. On the upper ends of these supports 13 stop rings 14 are installed to prevent the stirrups 12 from slipping off the supports 13.

Underneath the stirrups 12, the supports 13 are surrounded by pressure springs 15 which are locked underneath the stirrups 12 and supported on the rings 16 installed on the supports 13. It will be clear that in this manner the guide 11 is pressed upwards by the springs. Further, in the guide 11 a nylon layer 17 is installed in order to prevent wear of the chain.

It will be clear that the upper side of the chain 7 is pressed upwards by means of the springs 15 so that the elastic layer 8 is pressed against the rollers 2 and thus when the chain 7 is driven, the rollers are being turned by means of the chain 7 through the elastic layer 8. The objects which stand on the rollers will then be moved in the longitudinal direction of the conveyor belt by means of the turning rollers.

Because of the fact that a large force can be transmitted by the chain 7, it is possible by means of a reduced driving mechanism occupying little space to move a large number of rollers with sufficient power to move, by means of the rollers, even heavy objects.

Depending on the uses of the conveyor, it is also possible to omit the rollers 2 and to let the chain 7, via the elastic layer, come in direct contact with the objects that have to be moved lengthwise on the conveyor belt.

For long chains 7, it is possible to construct the elastic layer out of several short strips or sections 8 with teeth 9 and thus the manufacturing of the strip will be less costly than if it were manufactured in a single piece. At the same time, this permits the easy and cheap replacement of worn or damaged parts. Further, it is possible, when only intermittent drive is desired, to equip the chain on only certain of its sections with the elastic layer.

The embodiments of the invention in which an exclusive property or privilege is claimed are defined as follows.

1. An endless propelling means for a power driven conveyor, said propelling means having an endless chain and an elastic strip, said chain having a plurality of links each having an opening extending through the chain, said elastic strip having an elongated body, a plurality of anchor elements integral with and projecting from one face thereof and seated in openings in said links, said anchor elements each having an enlarged head and a reduced shank, said shank being of a size to be snugly received in one of said openings; said anchor elements being spaced apart twice the length of one of said chain links whereby only alternate ones of said openings are occupied by said anchor elements to permit the teeth of a sprocket to mesh with said chain.

2. The endless propelling means described in claim 1 further characterized in that said strip has a pair of ends, one of said anchor elements at each of said ends, a rigid means mounted on each of said anchor elements at each of said strip ends for stiffening said anchor elements against withdrawal from said chain.

3. The endless propelling means described in claim 1 further characterized in that said strip consists of a plurality of separate units mounted in tandem on said chain, each of said units having said stiffened anchor elements at each of its ends.

4. The endless propelling means described in claim 3 further characterized in that the face of each of said strip units opposite from said chain is tapered to form a ramp inclined toward said chain.

5. The endless propelling means described in claim 2 further characterized in that said rigid means is a rivet extending generally centrally through said anchor element.

6. An endless propelling means for a power driven conveyor, said propelling means comprising a chain having a plurality of pintles and spaces between the pintles, an elastic strip mounted on one face of said chain; said elastic strip having projections which fit into the spaces between the pintles of the chain; the distance between a pair of these projections being equal to twice the length of a link of the chain whereby only alternate ones of said spaces are occupied by said projections; the elastic strip at the projections being primarily T-shaped in cross section with the smaller part of the section positioned between the sides of the links of the chain and the broader part of the section extending over the links of the chain; the free end of each projection being enlarged lengthwise of the chain and the length of the projection being such that said enlarged end extends substantially through the chain.

7. An endless propelling means as described in claim 6 wherein said elastic strip consists of a plurality of separate sections arranged in tandem with each section being removable independently of every other section.

8. An endless propelling means as described in claim 7 wherein one of said projections is located at each end of each section.

9. An endless propelling means as described in claim 8 wherein means are provided for stiffening the projections at each of the ends of each of the sections.

* * * * *